United States Patent [19]
Reynolds

[11] Patent Number: 5,325,034
[45] Date of Patent: Jun. 28, 1994

[54] EMERGENCY POWER SYSTEM FOR CAPACITOR START MOTORS

[76] Inventor: William R. Reynolds, decease, late of 108 Mountain Hwy., Gillette, N.J. 07933 by Renata C. Reynolds, Executor Bethlehem, Pa.

[21] Appl. No.: 817,550

[22] Filed: Jan. 7, 1992

[51] Int. Cl.$^5$ .............................................. H02H 5/04
[52] U.S. Cl. .................... 318/782; 318/749; 318/795; 361/23
[58] Field of Search ............... 318/782, 794, 795, 754, 318/751, 466, 787, 762, 749, 747, 786; 361/23, 51, 54, 55; 323/276

[56] References Cited

U.S. PATENT DOCUMENTS

| | | | |
|---|---|---|---|
| 4,258,368 | 3/1981 | Arnold et al. | 318/762 |
| 4,722,019 | 1/1988 | Pohl | 318/782 |
| 4,794,309 | 12/1988 | Saito et al. | 318/466 |
| 4,843,295 | 6/1989 | Thompson et al. | 318/786 |
| 4,853,569 | 8/1989 | Lewus | 318/795 |

Primary Examiner—William M. Shoop, Jr.
Assistant Examiner—John W. Cabeca
Attorney, Agent, or Firm—Pearne, Gordon, McCoy & Granger

[57] ABSTRACT

An emergency power circuit powers an induction motor which has at least first and second windings. The motor is normally operating at a normal speed determined by connection to commercial frequency power line, but which is subject to failure. During failure the emergency power circuit is used to supply emergency power from a DC storage battery. An inverter is supplied by the battery and has an output connectable to the motor. A control circuit for the inverter establishes a first frequency to run the motor at a running speed which is considerably less than the normal speed. Single, two-phase and three-phase systems are disclosed as well as a soft start system to start the motor at about one-fourth speed and run it at one-half speed. Preferably a high frequency oscillator is used with the frequency divided dozen to operate the motor at a speed below normal 60 Hz energization speed. The foregoing Abstract is merely a resume of general applications, it is not a complete discussion of all principles of operation or applications, and is not to be construed as a limitation on the scope of the claimed subject matter.

23 Claims, 7 Drawing Sheets

EMERGENCY POWER SYSTEM FOR CAPACITOR START MOTORS

BACKGROUND OF THE INVENTION

Many electrical circuits are intended to be used on commercial frequency power lines such as 60 Hz, 115/230 V AC. However, sometimes the commercial power line has an outage and it is then desireable to have an emergency power circuit to power such loads.

A typical emergency power supply, for example, for computers is to have a storage battery operating through an inverter to supply the same 60 Hz, 115/230 V AC output to the computer so that it is connected immediately upon failure of the commercial power line voltage. The computer may take only a few hundred watts and therefore the physical size and capacity of the emergency power supply is rather small. However, when the load is substantial, such as a home elevator, chair lift, wheel chairlift, etc., the physical size and cost of such an emergency power supply having an output at 60 Hz and 230 V AC becomes economically prohibitive.

An object of the invention, therefore, is to provide an emergency power supply of reduced physical size and electrical output capacity which still may be able to operate a substantial electrical load such as a home elevator, chairlift, wheel chairlift, etc.

Another object of the invention is to provide an emergency power circuit for an induction motor having at least first and second windings.

Another object of the invention is to provide an emergency power system to operate an electrical load at less than normal speed in order to reduce the power requirements.

SUMMARY OF THE INVENTION

The invention relates to an emergency power circuit for an induction motor having at least first and second windings, the motor normally operating at a normal speed determined by connection to a commercial frequency power line subject to failure. The emergency power circuit comprising in combination an emergency power DC storage battery, inverter means supplied by the battery and having output terminals connected to the motor and a control circuit for the inverter means establishing a first frequency to run the motor at a running speed considerably less than the normal speed.

DESCRIPTION OF THE PREFERRED EMBODIMENTS

Figure 1:
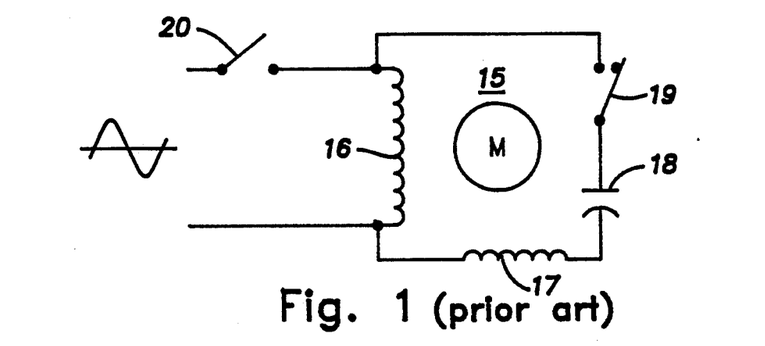
FIG. 1 is a circuit showing a prior art capacitor start induction motor having run and start windings.

FIG. 1 illustrates an induction motor 15 having first and second windings 16 and 17. The winding 16 may be a main winding and winding 17 may be a start winding with a capacitor 18 connected in the circuit when a switch 19 is closed. This may be a switch controlled by a timer or by current or centrifugal force for example. A main switch 20 may be closed to energize the motor from a commercial frequency line voltage such as 60 Hz, 115/230 V AC. This inverter may be used to run an induction motor for a home elevator, chairlift, wheel chairlift, etc., typically in a home. The motor also may be used for other purposes, such as a garage door opener, furnace blower, water pump, etc.

The commercial power is subject to failure, and in many cases the motor load is one which one really wants to be energizable even during such power outages.

The motor 15 is designed to be a capacitor start motor with the switch opening at some speed below normal speed. For example, it might open at 1500 rpm and then the four pole motor would accelerate to about 1725 rpm and run at that normal speed which is synchronous speed minus slip speed.

Figure 2:
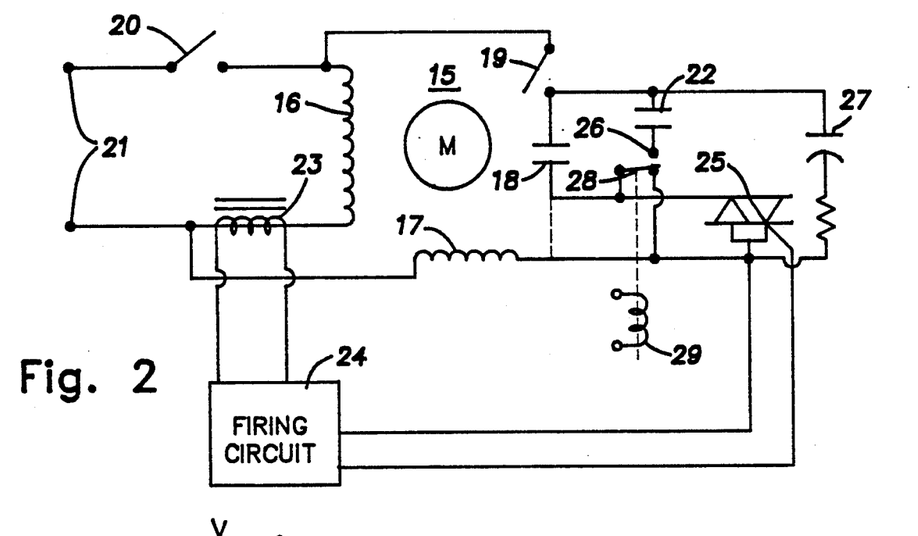
FIG. 2 is a circuit diagram of one form of the invention operating from a low frequency source.

FIG. 2 shows an emergency power circuit for this induction motor 15. The circuit of FIG. 2 shows a low-frequency source 21 to run the motor 15 at a speed considerably less than normal speed. If one tried to provide an emergency power supply which would supply normal frequency such as 60 Hz and full voltage to the motor, this emergency power supply would be quite large and economically prohibitive. Typically to start this motor requires six to eight times full-load current. For example, a 1.5 HP motor 230 V, 1725 rpm draws approximately 60 amps to start. This starting current lasts typically less than one second. Nevertheless, 60 amps × 230 V = 13,800 V amps to start. If this were run from a 24 V battery system, it would require an inverter with an input of over 600 amps. This would be cost prohibitive and a large cumbersome supply.

FIG. 2 shows one embodiment of the present invention which runs the motor at a speed considerably less than the normal speed. This is accomplished by changing the frequency at a substantially constant volt second rate. This maintains a constant torque if the starting capacitor 18 is changed inversely proportional to the frequency.

Figure 3:
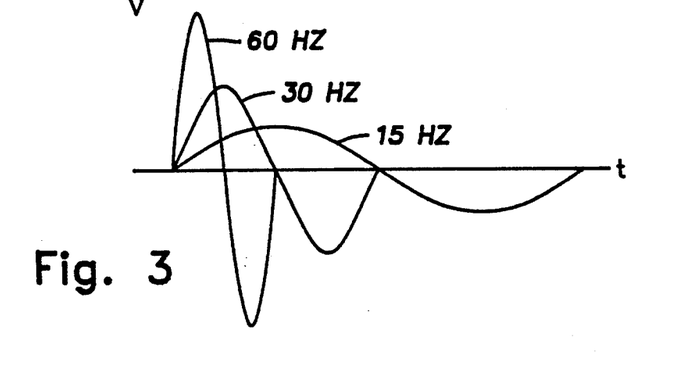
FIG. 3 is a graph of voltage for different frequencies.

FIG. 3 illustrates a graph of voltages of 60 Hz, 30 Hz and 15 Hz. In each case the area under the curve is identical so that the torque remains substantially constant. By reducing the speed, the horsepower is reduced in direct proportion. For example, operating the motor 15 at 30 Hz and 115 V, if the motor would run and carry the load, the motor speed would be reduced to approximately 860 rpm, ¾ horsepower at the original torque reducing the input starting power to about 50%.

This starting current is now only about 300 amps, a considerable savings in starting power. At 15 Hz it would be 150 amps in order to start, yet still having the same torque. The reduction of current is also true for the running power at running speed. The power is still 10 amps output current, but only 115 V, instead of the original 230 V, reducing the input power to 1150 volt amps instead of 2300 volt amps.

However, because of the slow speed, the normal centrifugal switch 19 of the motor will never open. Some other means of disconnecting the start capacitor 18 is provided in FIG. 2. This disconnection of the start capacitor could be accomplished in many ways. In a new motor, a second set of centrifugal switches could be installed. For motors already in existence, a timer, resistor, piezo, Hall effect, could operate a relay, a triac or back-to-back SCR's in order to disconnect the start capacitor once the motor bas come up to its new running speed. In FIG. 2 a current transformer 23 senses the high starting current and causes a firing circuit 24 to cause conduction of a triac 25. A switch contact 26 is closed during this emergency starting condition so that the additional capacitor 22 is in the circuit. When the current transformer 223 senses a reduced current after starting, then the triac 25 is turned off so that the start winding 17 is disconnected from the circuit.

The most practical inverter system, that is one that is small and less expensive limits current at initial start. This means that the output voltage is reduced. This makes it impractical to use the motor inverter to supply anything other than a hoisting motor load. A second bias inverter, not shown, is used to power the elevator controls-contacter, brake and safeties. This bias inverter is run at the normal voltage and frequency of the commercial power source.

In order to supply current under regeneration, that is with an overhauling load, the capacitor start motor is made into a capacitor start, capacitor run motor. A run capacitor 27 connected in the circuit across the triac 25 by the opening of a switch 28 ganged to the switch 26. The capacitor start motor requires a leading power factor load in order to regenerate. The motor with an overhauling load will run as a generator synchronous speed plus slip speed and at 30 Hz this running speed would be about 940 rpm. The run capacitor 27 will still be in the circuit even though the triac 25 becomes non-conducting. The switch 26 is closed and switch 28 is open during normal operation at 60 Hz, by means of a relay 29 energized upon failure of the commercial 60 Hz power source.

Figure 4:
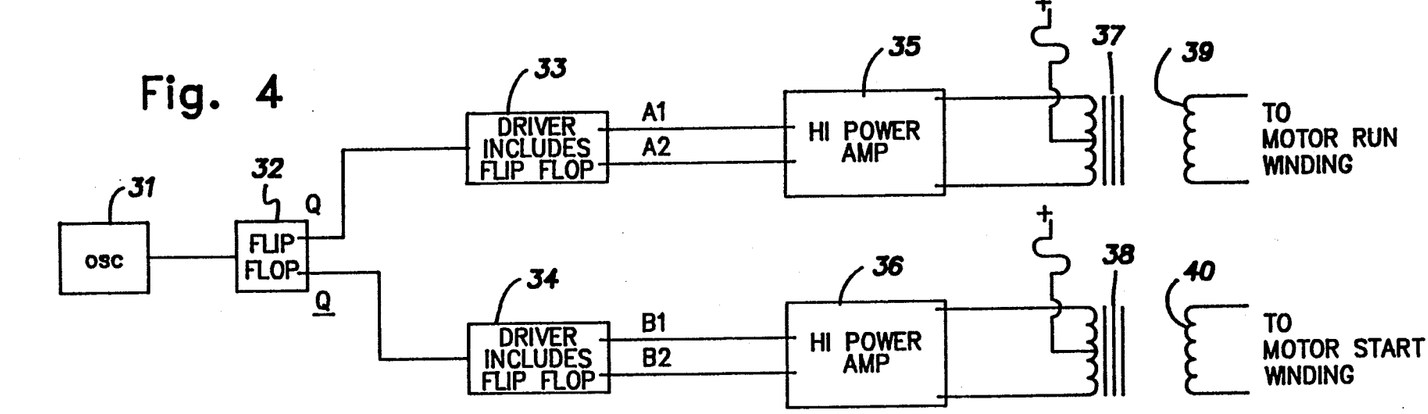
FIG. 4 is a circuit diagram of a two phase system.
Figure 4A:
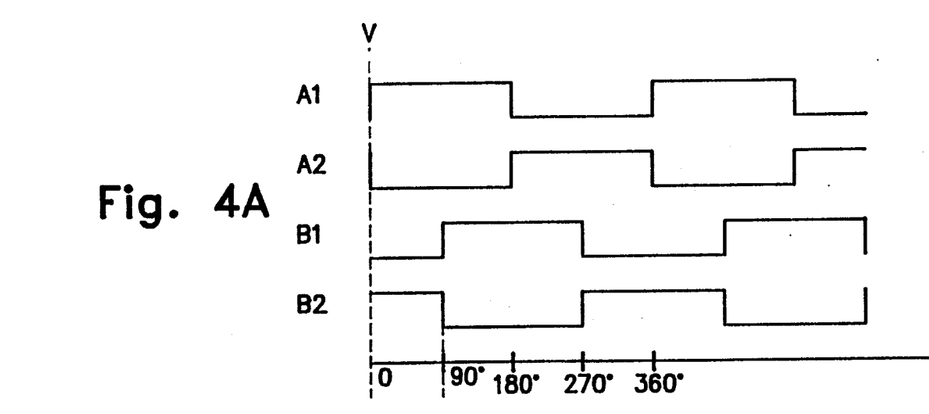
FIG. 4A is a graph of the voltage outputs of FIG. 4.
Figure 5:
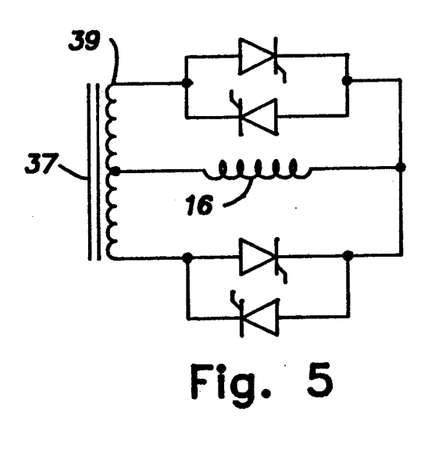
FIG. 5 is a circuit diagram of the energization of the new winding.

In FIG. 4 the transformer 37 has an output winding 39. FIG. 5 shows a typical circuit which may be used to energize the run winding 16. The transformer 37 is operating at a high frequency, for example 240 Hz, and with the motor run winding 16 operated at a lower frequency, for example 30 Hz. The energization circuit the start winding 17 would be similar to that of FIG. 5, but would be 90° displaced for either a single phase capacitor start motor or a two-phase motor.

Figures 6, 7:
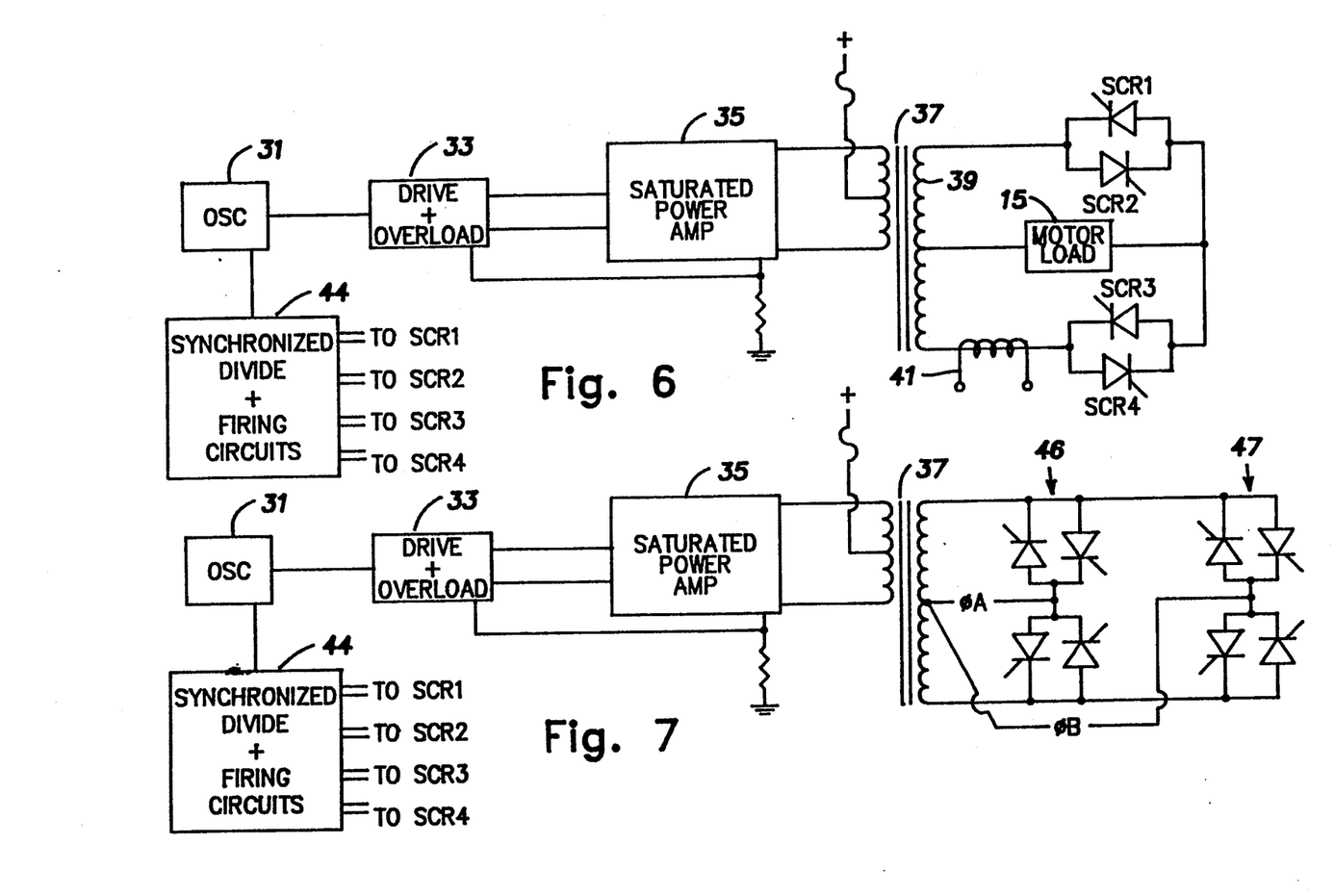
FIG. 6 is a circuit diagram of a single phase system.
FIG. 7 is a circuit diagram of a two phase system
Figure 6A:
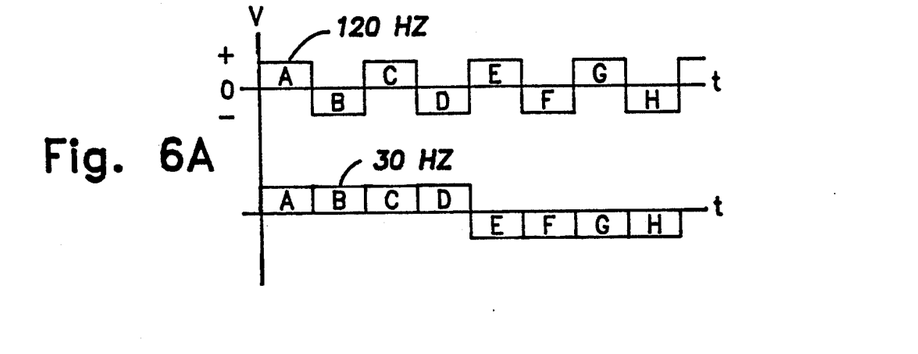
FIG. 6A is a diagram of voltages in the circuit of FIG. 6.

FIG. 6 is a schematic diagram of another embodiment of the invention wherein the oscillator 31 operates through the driver 33 and saturated power amplifier 35 to the inverter transformer 37. The transformer output winding 39 again operates at a high frequency, for example 120 Hz, as shown in FIG. 6A. A synchronized divide and firing circuit 34 fires SCR2 and SCR4 alternately at a 30 Hz rate as shown in FIG. 6A. This firing is for four half cycles of the oscillator frequency. Next, the SCR1 and 3 are fired alternately for another four half cycles so that a 30 Hz alternating voltage wave is supplied to the motor winding 16. This dividing by four is merely an example and the dividing circuit is usually by eight or sixteen inorder to have a high frequency oscillator, a high frequency transformer and a low frequency supplied to the motor load. FIG. 6 also shows a current transformer 41 in the inverter output to sense a stall condition of the motor and turn off the emergency power circuit.

Figure 7A:
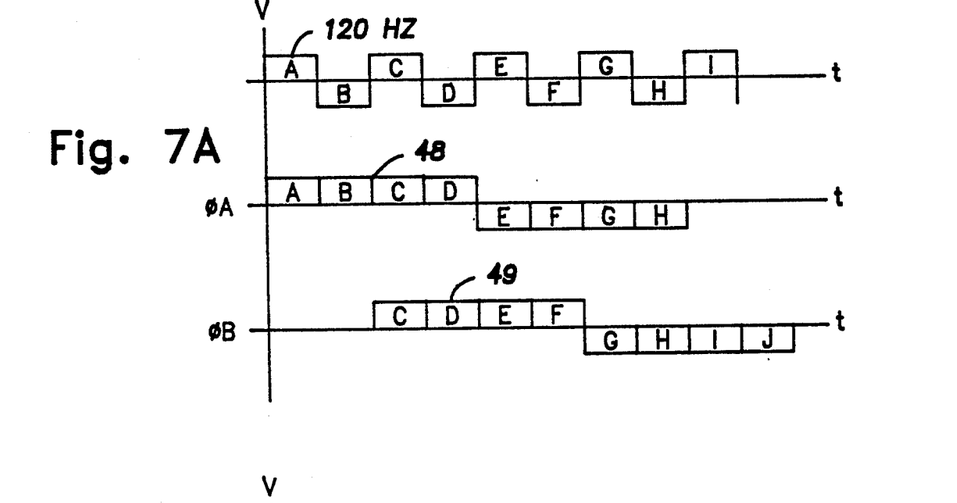
FIG. 7A is a graph of voltages in the circuit of FIG. 7.

FIG. 7 is a schematic diagram of a two-phase system to the left of the dotted vertical line. In this example the oscillator 31 operates at 120 Hz as shown by the voltage graph of FIG. 7A. The power amplifier 35 and transformer 37 also operate at 120 Hz to supply a first set of SCR's 46 for phase A and a second set of SCR's 47 for phase B. These would be two different motor windings 16 and 17. The synchronized divide and firing circuit 44 for a two-phase system would supply the two different phases 90° displaced as shown in the curves 48 and 49, respectively, in FIG. 7A.

Figure 8:
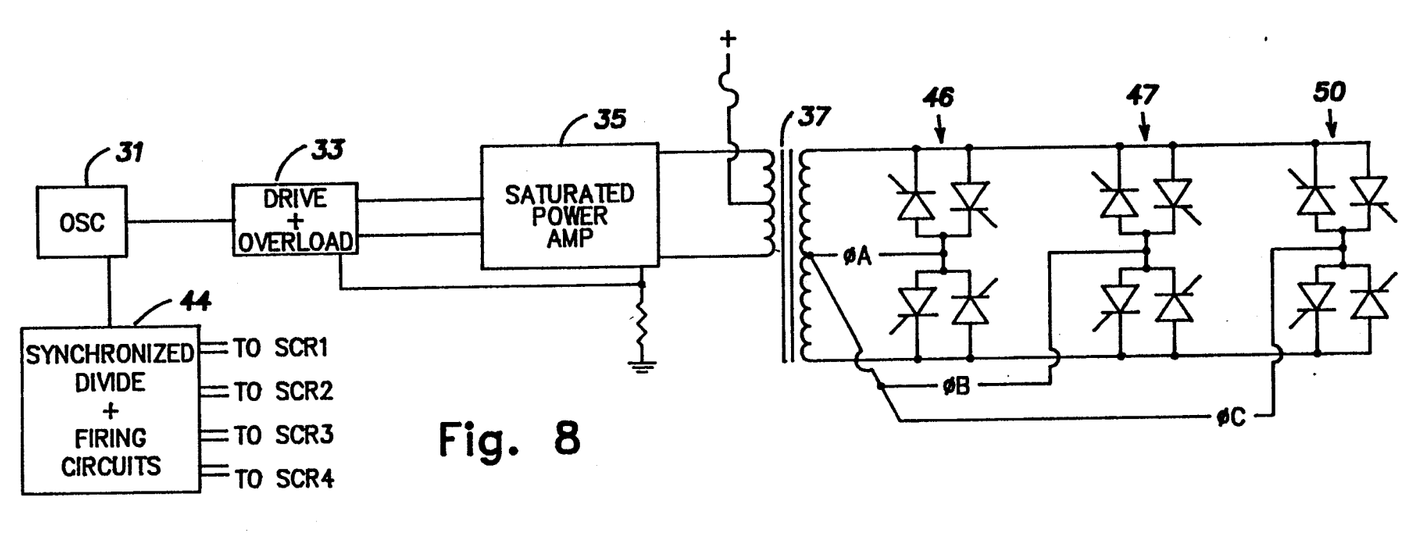
FIG. 8 is a circuit diagram of a three phase system.
Figure 8A:
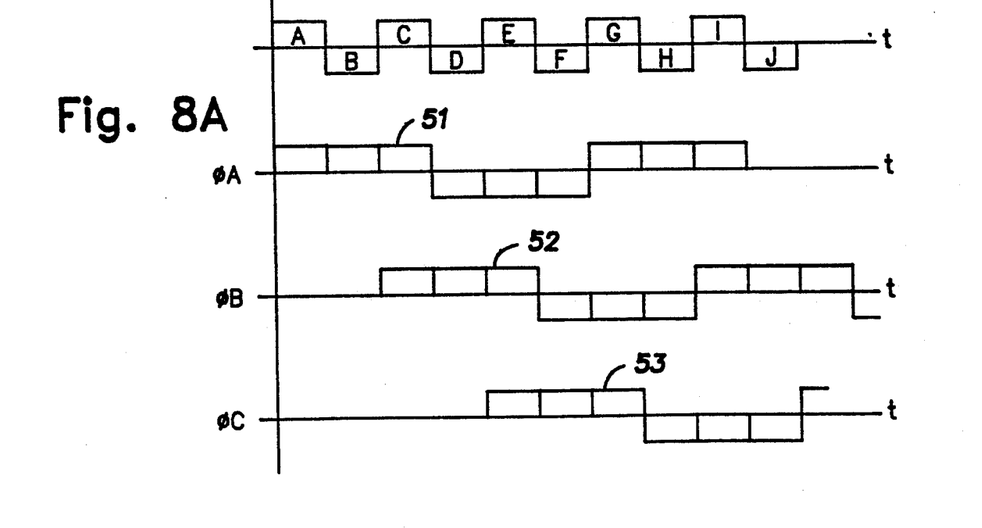
FIG. 8A is a graph of voltages for a three phase system.

FIG. 8 shows an additional set of SCR's 50 which may be adaed in parallel to the first and second SCR sets 46 and 47. This can then be a three-phase circuit with the synchronized divide and firing circuit 44 controlling the three sets of SCR's so that the voltage curves 51, 52 and 53 of FIG. 8A are mutually 120° with respect to each other.

Figure 9:
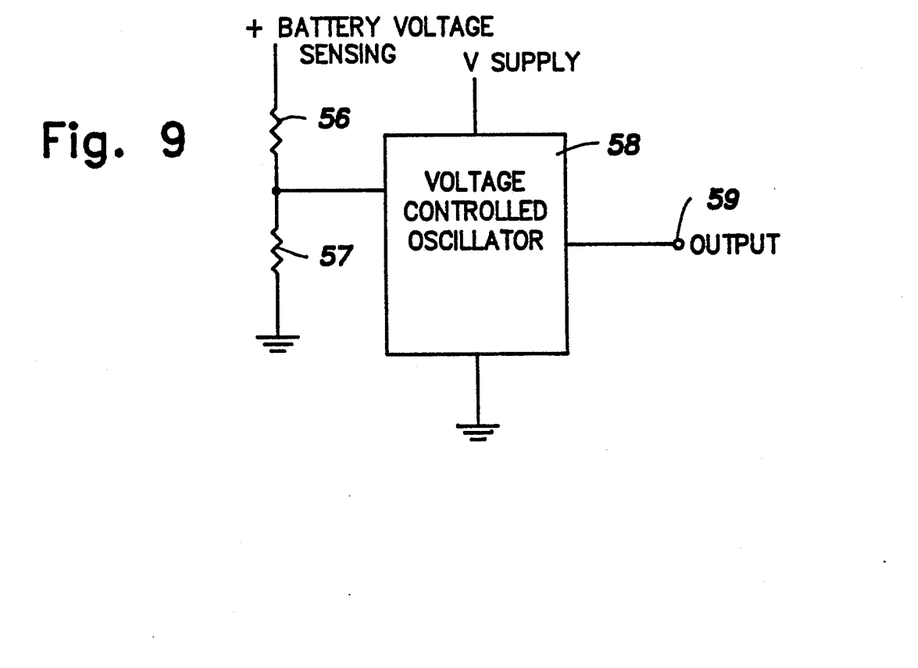
FIG. 9 is a circuit diagram of a voltage controlled oscillator circuit.

FIG. 9 shows a circuit to maintain substantially constant volt seconds on the frequency supplied to the motor. FIG. 9 shows the battery voltage sensing the potential of the emergency storage battery and resistors 56 and 57 provide a voltage divider supplying a voltage controlled oscillator 58. The output 59 is a frequency varying directly proportional to the battery voltage, thus the 24 V battery under load might drop to 20 V and then as the battery discharged during use, the voltage might drop to 18 V or 16 V. The frequency of the oscillator would correspondingly be decreased to maintain the constant volt seconds. The motor now runs more efficiently.

Figure 10:
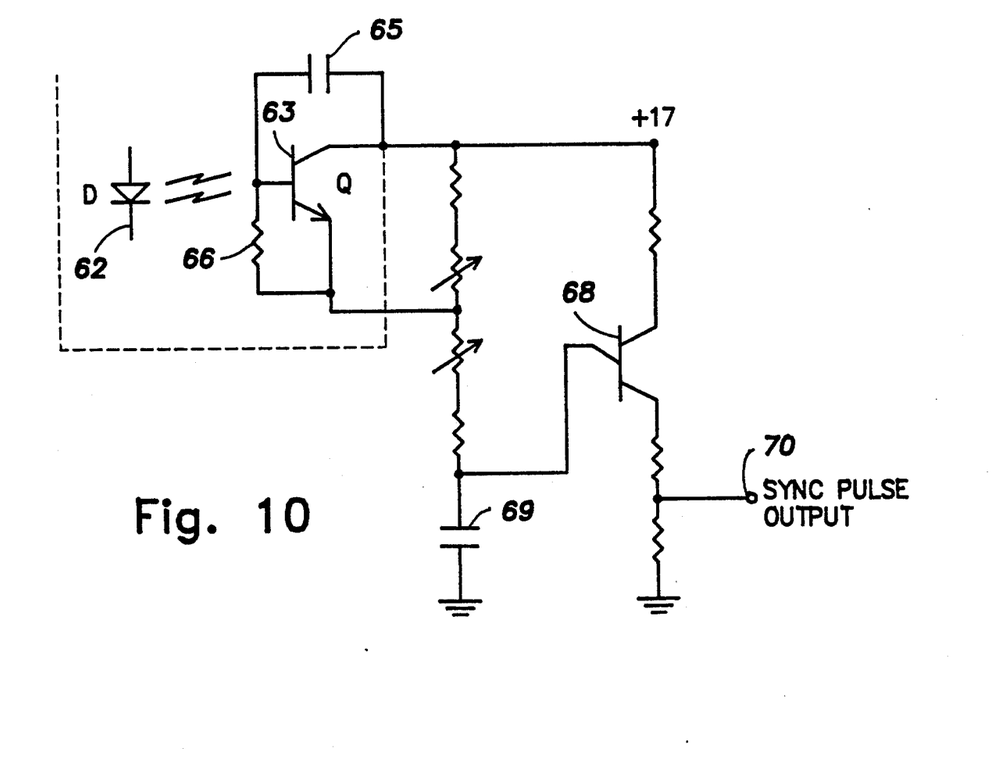
FIG. 10 is a circuit diagram of a pulse generator with a ramp control.

The emergency power circuit of the present invention would have a manually controllable master switch for up or down conditions of the elevator motor. A typical control would be to have the up and down switches controlling a contacter or relay which would reverse the polarity of the start winding in a single phase motor. A light emitting diode 62 would be connected across the UP relay coil. The diode is a part of an opto-isolator including a photo transistor 63. A capacitor 65 charges slowly through a resistor 66 turning the transistor 63 on slowly. A unijunction transistor 68 is part of a relaxation oscillator circuit wherein the output of the transistor 63 charges a capacitor 69 as part of the relaxation oscillator circuit. This unijunction transistor supplies an output 70 which is a synchronizing pulse output such as is used in FIG. 6 for example, to control the drive and overload circuit 33. In this manner the gradual chargingiof the capacitor 65 gradually increases the oscillator frequency. For example, the motor might start at 15 Hz for low power requirement of the storage battery and inverter and then increase to about 30 Hz after about 1 second for the running speed of the motor. These one-fourth speed and one-half speed conditions are examples, but are typical of a practical circuit.

Figure 11:
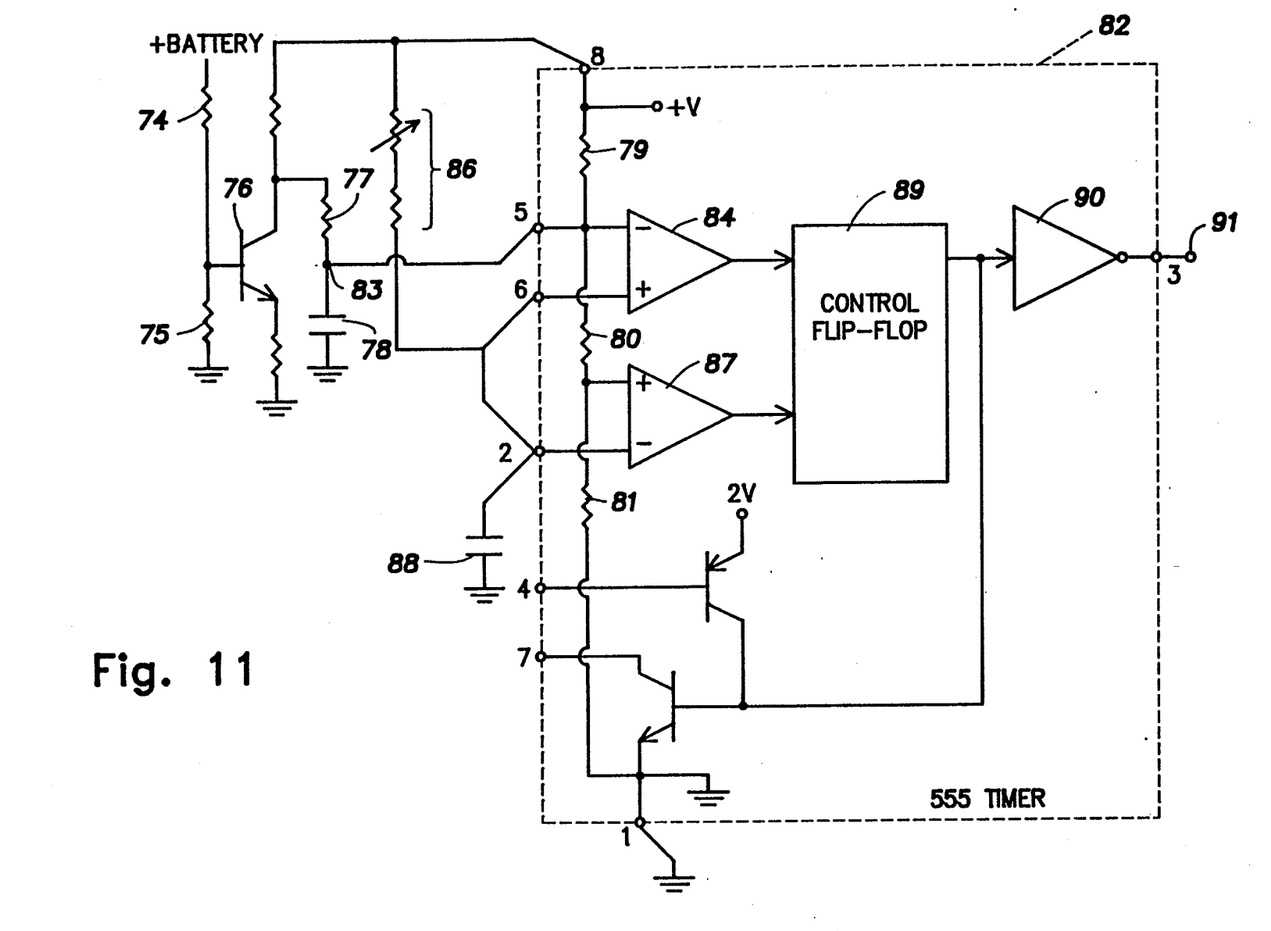
FIG. 11 is a timer circuit to generate pulses used for synchronizing.

FIG. 11 is a schematic diagram of a circuit which may be used as an alternative to the circuit of FIG. 9. The battery voltage is applied to voltage divider resistors 74 and 75 so that frequency of the transistor 76 is directly proportional to the battery voltage, decreasing in frequency as the voltage of the battery decreases. This sets a voltage on the collector of this transistor 76 and the voltages applied to an output resistor 77 and filter capacitor 78. The resistor 77 is effectively in parallel with voltage divider resistors 79, 80 and 81 in a 555 timer 82. The terminal 83 between resistor 77 and capacitor 78 supplies a control voltage to an inverting input of an upper component amplifier 84. The noninverting input of this amplifier is supplied through a variable resistor 86, which also supplies the inverting input of a lower component amplifier 87. On the timer 82 the terminal 2 is a trigger terminal, terminal 4 is a reset terminal and terminal 7 is a discharge terminal. A capacitor 88 sets the trigger value. Amplifiers 84 and 87 supply a control flip-flop 89 which through an amplifier 90 supplies an output 91. These are pulses used for synchronizing. In operation, the resistor 77 effectively parallels the voltage divider 79, 80, 81 to alter the timing threshold thereby changing the output frequency. Again the frequency may be 15 Hz for starting the motor and then 30 Hz for running the motor in an up or hoisting condition. For a down condition of the elevator wherein the load is overhauling, the motor acts as a generator regenerating power back through the inverter and the motor starts at half speed. In the example this would be the 30 Hz for the generator acting at half speed plus slip speed or about 940 rpm.

Figure 12:
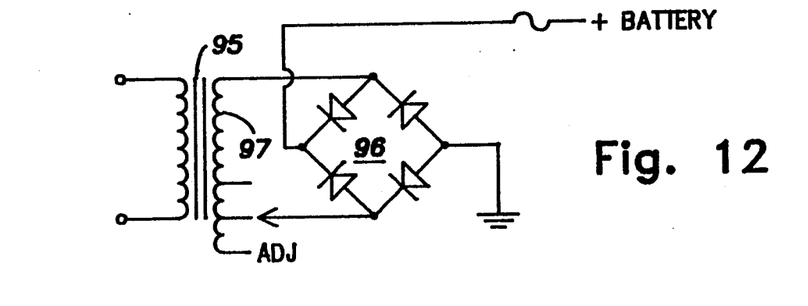
FIG. 12 is a circuit diagram of a regeneration circuit.

FIG. 12 shows a regeneration circuit including a feedback transformer 95 supplied from the output of the run phase inverter. This transformer supplies a rectifier shown as a bridge rectifier 96 from the transformer secondary 97. The output of the rectifier goes to charge the battery with an adjustment on the secondary winding for proper regeneration. In the SCR divide circuits of FIGS. 6, 7 and 8 the current can flow in only one direction. When the systems try to regenerate, the SCR's are back biased and turn off only to refire. With the feedback transformer 95 in the circuit, the regenerative energy is returned to the storage battery. The various circuits show a low power and hence economical emergency power circuit to provide energy to an induction motor having at least first and second windings. These may be single-phase, two-phase or three-phase motors and either a capacitor start or capacitor start-/capacitor run motor. The operation of the motor at considerably less than normal speed still provides the same torque so that the motor will start the load and run it at a lower speed to save power requirements of the storage battery and inverter. Further refinements include a soft start wherein the motor starts at about one-fourth speed and then runs at one-half speed, thus further reducing the power requirements during starting.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An emergency power circuit for an induction motor having at least first and second windings, said motor normally operating at a normal speed determined by connection to a commercial frequency power line subject to failure, comprising, in combination:
 an emergency power DC storage battery;
 inverter means supplied by said battery and having output terminals connectable to said motor;
 a control circuit for said inverter means; and
 said control circuit establishing a run frequency to run said motor at a running speed considerably less than said normal speed.

2. An emergency power circuit as set forth in claim 1, including sensor means responsive to current in one of said motor windings to be responsive to a stall condition of said motor to inhibit output from said inverter means to said motor.

3. An emergency power circuit as set forth in claim 1, wherein said motor is a capacitor-start single phase motor.

4. An emergency power circuit as set forth in claim 1, wherein said motor is a capacitor-start capacitor-run motor.

5. An emergency power circuit as set forth in claim 1, wherein said motor is a single phase motor with the first and second windings displaced in space, and said inverter means includes a division to supply two outputs out of phase.

6. An emergency power circuit as set forth in claim 1, wherein said motor is a two-phase motor, and said inverter means includes a divider to supply two outputs substantially 90° out of phase.

7. An emergency power circuit as set forth in claim 1, wherein said motor is a three phase motor, and said inverter means includes a divider to supply three outputs mutually operating 120° out of phase.

8. An emergency power circuit according to claim 1, wherein said control circuit establishes a start frequency lower than said frequency to start the motor at a starting speed less than said running speed.

9. An emergency power circuit as set forth in claim 8, wherein said inverter means starts the motor for lifting loads at said starting speed, and during lowering of the load, the load is overhauling to cause the motor to act as a generator forcing power back through the inverter means, and said control circuit supplying a generating frequency for starting the motor as a generator at about said running speed.

10. An emergency power circuit as set forth in claim 9, wherein after said motor is started with a lifting load it runs at approximately one-half speed minus slip, and wherein said motor acting as a generator is started and runs overhauling loads at approximately one-half speed plus slip.

11. An emergency power circuit as set forth in claim 8, wherein said starting and running speeds are in the order of one-fourth and one-half normal motor speeds, respectively.

12. An emergency power circuit as set forth in claim 8, including means after starting to gradually change from said starting to said running speed.

13. An emergency power circuit as set forth in claim 8, including a capacitor charged through a resistor with the charging of the capacitor increasing a frequency of the inverter means.

14. An emergency power circuit as set forth in claim 1, including an oscillator to develop an oscillator frequency for said running speed.

15. An emergency power circuit as set forth in claim 14, wherein said oscillator is a relaxation oscillator.

16. An emergency power circuit as set forth in claim 14, wherein said oscillator frequency is reduced by a divider to achieve a reduced frequency controlling said running speed.

17. An emergency power circuit as set forth in claim 16, including a transformer connected as part of said inverter means and said transformer operated at said oscillator frequency for reduction of size and weight of said transformer.

18. An emergency power circuit according to claim 1, further comprising:
 a first capacitor connected across at least one of the windings;
 a second capacitor connectable across at least one of the windings; and
 means for connecting the second capacitor across at least one of the windings responsive to a failure of the commercial power.

19. An emergency power circuit according to claim 18, further comprising means for disconnecting the first and second capacitors from the windings after a starting current of the motor falls below a selected magnitude after starting.

20. An emergency power circuit according to claim 19, further comprising a third capacitor connected across at least one of the windings.

21. An emergency power circuit according to claim 20, further comprising a regeneration circuit connected to an output of the inverter, thereby charging the battery.

22. An emergency power circuit according to claim 1, further comprising a regeneration circuit connected to an output of the inverter, thereby charging the battery.

23. A method of operating an induction motor having a starting capacitance connectable across a winding of the motor comprising the steps of:
 providing a first power source to the motor at a normal frequency;
 providing a second power source at an emergency frequency substantially lower than said normal frequency;
 connecting the second power source to the motor upon a failure of the first power source and a request for motor action; and
 changing the starting capacitance of the motor to correspond to whichever of the first and second power sources is connected to the motor.

* * * * *

UNITED STATES PATENT AND TRADEMARK OFFICE
CERTIFICATE OF CORRECTION

PATENT NO. : 5,325,034
DATED : June 28, 1994
INVENTOR(S) : William R. Reynolds et al.

It is certified that error appears in the above-identified patent and that said Letters Patent is hereby corrected as shown below:

Column 3, line 18, delete "bas" and insert --has--;

line 24, delete "223" and insert --23--;

line 39, after "27" insert --is--; and line 43, after "generator" insert --at--.

Column 4, line 5, delete "inorder" and insert --in order--;

line 23, delete "adaed" and insert --added--; and line 59, delete "chargingiof" and insert --charging of--.

Column 5, line 1, after "that" insert --the--.

Signed and Sealed this

Eighteenth Day of October, 1994

Attest:

BRUCE LEHMAN

*Attesting Officer*    *Commissioner of Patents and Trademarks*